(12) United States Patent
Kim et al.

(10) Patent No.: US 7,068,259 B2
(45) Date of Patent: Jun. 27, 2006

(54) KEY DATA INPUT DEVICE AND MOBILE COMMUNICATION TERMINAL USING THE SAME

(75) Inventors: Ki-Hyun Kim, Suwon-shi (KR); Hyun-Myung Song, Seoul (KR)

(73) Assignee: Samsung Electronics Co., Ltd. (KR)

( * ) Notice: Subject to any disclaimer, the term of this patent is extended or adjusted under 35 U.S.C. 154(b) by 180 days.

(21) Appl. No.: 10/207,719

(22) Filed: Jul. 29, 2002

(65) Prior Publication Data

US 2003/0020694 A1    Jan. 30, 2003

(30) Foreign Application Priority Data

Jul. 27, 2001  (KR) .............................. 2001-45323

(51) Int. Cl.
*G09G 5/00*    (2006.01)
(52) U.S. Cl. ....................... 345/169; 345/160; 345/168
(58) Field of Classification Search ................ 345/156, 345/157, 160, 161, 168, 169
See application file for complete search history.

(56) References Cited

U.S. PATENT DOCUMENTS

| 5,252,952 | A  | * | 10/1993 | Frank et al. ................ 345/157 |
| 6,266,046 | B1 | * | 7/2001  | Arita ........................... 345/156 |
| 6,297,806 | B1 | * | 10/2001 | Skoog ......................... 345/160 |
| 6,441,753 | B1 | * | 8/2002  | Montgomery ................ 341/34 |
| 6,528,740 | B1 | * | 3/2003  | Miyoshi ...................... 200/5 R |
| 6,700,565 | B1 | * | 3/2004  | Niiyama ...................... 345/172 |

* cited by examiner

*Primary Examiner*—Kent Chang
(74) *Attorney, Agent, or Firm*—Dilworth & Barrese LLP (57) ABSTRACT

A mobile communication terminal with a one-keyed data input device is disclosed. The one-keyed data input device includes a recess portion formed on the top surface of a main body of the terminal and a center key positioned in the recess portion. The center key is arranged to be movable in the uppermost or lowermost direction or in the leftmost or rightmost direction from the center of the recess portion and movable in the radial direction from the center. The device includes a data input assembly having a signal generation guide assembly for generating an electrical signal for selected data, said signal generation guide assembly being movable together with the center key coupled thereto, a vertically moving conductive material disposed below and in contact with the signal generation guide assembly, against which the signal generation guide assembly may move, a first elastic body disposed below the vertically moving conductive material, for providing the vertically moving conductive material with a physical force to get contact with the signal generation guide assembly, and a base supporting the first elastic body and the signal generation guide assembly, for transferring generated electrical signal to a main printed circuit board.

15 Claims, 8 Drawing Sheets

KEY DATA INPUT DEVICE AND MOBILE COMMUNICATION TERMINAL USING THE SAME

PRIORITY

This application claims the priority to an application entitled "One-Keyed Data Inputting Device And Portable Telephones Utilizing The Same" filed in the Korean Industrial Property Office on Jul. 27, 2001 and assigned the Serial No. 2001-45323, the contents of which are hereby incorporated by reference.

BACKGROUND OF THE INVENTION

1. Field of the Invention

The present invention relates generally to a key-data inputting in a mobile communication terminal, such as mobile phones, for use in digital mobile communication systems. The present invention relates more particularly to a single keyed data inputting device adapted for entering desired key-data, for example, by pushing, drawing or depressing a single key with respect to a body of the mobile phone, and also to the mobile communication terminal provided with the single keyed data inputting device.

2. Description of the Related Arts

Conventionally, mobile communication terminals such as mobile telephones may be classified into a bar-type terminal, a flip-type terminal or a folder-type terminal in accordance with to their appearance and body structure, or further into a wrist-type terminal or a neck-wearable terminal in accordance with the wearing style with their users. Furthermore, they may be classified into a voice-communication dedicated terminal, an image-communication serviceable terminal or an Internet protocol based terminal according to their functions when using them. Most recently, the flip-type or folder-type mobile terminals have become popular among mobile subscribers or users more than the bar-type one, but in the near future, it is most likely that the various types of wearable mobile phones such as a wrist-type terminal or a neck-wearable terminal will be favored among younger users because they may be more convenient and may not need to be hand held during use as compared to those conventional ones.

Further describing the folder-type terminal by way of an example of the prior art mobile phone, it is usually comprised of a main body, a folder and a hinge means coupling the main body and the folder, the hinge means being adapted to pivotably open and close the folder to a predetermined angle position upon using of it. The main body further includes a data input means and a microphone, while the folder includes a data output means and a speaker. The data input means of a known mobile phone is provided with a keypad having a set of keys or buttons arranged in a multiplicity of rows and columns, for example, 3×4 matrix, while the data output means normally includes an LCD (liquid crystal display) module or a display panel. Alternatively, a touch screen or any voice recognition means may be utilized as the data input means to enter any desired key data.

Among the various data input means, heretofore described, for use in mobile phones, a data inputting system using a keypad has been most prevailing in the state of the art owing to the simplicity of construction, because its user is able to conveniently input any desired data on his or her mobile phone by means of merely depressing one or more keys with fingers sequentially. This keypad assembly normally uses a sort of direct key entry system, in which activation of any one of desired key data or functions can be effected by depressing a corresponding key or button by one of user's fingers as occasion demands.

One known keypad generally consists of a set of data keys for inputting numerals or characters (for instance, the alphabet) into the phone, and a set of function keys for operating starting and termination of a call, or selecting a menu where appropriate. Thus, it is preferably designed to have more than 15 keys in one keypad, most preferably 15 to 20 keys in total. Recently however, it has been often demanded for some user's mobile phones to be provided with more than 20 keys, in particular in case where the user prefers to use his or her mobile phone for the purpose of enjoying Internet communications service, e-mail transmission, phone-chatting, short-message-service (SMS), etc. In the nearest future, it is most likely that a keypad consisting of more than 20 keys, even more up to 30 keys, would be preferred by some mobile phone subscribers.

A recent trend in developing mobile phones has been to build lighter and smaller body for satisfying the users' increasing needs. Such a mobile phone with lighter and smaller body essentially requires smaller sized LCD display panel and keypad. These small LCD displays and keypads will most likely create some disadvantages for the users. For example, it will not be easy for a user to read out displayed data because the size of images on it becomes smaller and it will not be convenient for the user to enter data onto a small-sized keypad with fingers. Accordingly, overcoming such disadvantages has been considered as one of the most significant factors in development of more compact and smaller sized mobile phones in this field of art. Furthermore, the keypad assembly utilized for a data input means in the known and conventional mobile phones generally has the following disadvantages:

Firstly, those conventional keypads normally require the keypad arrangement consisting of more than at least 15 keys on it, thereby causing a problem to development of smaller sized and more compact mobile phone, since each key of the keypad must be depressable by a user. Such a key depressing action by fingers onto a keypad will eventually cause a considerable degree of technical limitation to design of smaller sized keys, thereby causing a similar problem to design of smaller and more compact sized keypad assembly to satisfaction of increasing needs from the users; and Secondly, in order to input a desired key data, a user has to depress a corresponding key by fingers. These keys are invariably much smaller than the user's fingers and thus may be quite annoying to some users when using them. This troublesome key depressing action would also cause entering incorrect data. In particular, in case of repeating a series of key depressions on the keypad, it will sometimes cause a key error depressing an undesired key owing to incorrect manipulation of fingers, which mostly results from complicated key-depressing system in keypads of the conventional mobile phones.

Finally, the conventional keypad assembly creates a considerable degree of technical limitation on the design of an external appearance of the mobile phone. For example, designers of these mobile phones are burdened with having to design an outer body incorporating a conventional keypad assembly.

SUMMARY OF THE INVENTION

It is, therefore, an object of the present invention to provide a one-keyed data inputting system most suitable for smaller sized body structure of a mobile phone.

It is another object of the present invention to provide a one-keyed data inputting system of a mobile phone most suitable for equipment of a comparatively larger LCD display module.

It is still another object of the present invention to provide a one-keyed data inputting system of a mobile phone capable of simplifying data inputting into the mobile phone.

It is other object of the present invention to provide a one-keyed data inputting system of a mobile phone capable of allowing more freedom of design when designing an outer appearance of the body.

It is further object of the present invention to provide a one-keyed data inputting system most suitable for smaller sized body of a mobile phone with a comparatively larger LCD display module.

To achieve the above and other objects, the present invention provides a one-keyed data input device for a mobile communication terminal, in particular mobile phone. In one aspect, the mobile communication terminal comprises a recess portion formed on a top surface of a main body of a terminal. A center key positioned in the recess portion is arranged to be movable in the uppermost or lowermost direction or in the leftmost or rightmost direction from the center of the recess portion and movable in the radial direction from the center. A data input assembly is coupled to the center key. The data input assembly includes a signal generation guide assembly for generating an electrical signal for selected data, and is movable together with the center key. A vertically moving conductive material is disposed below and in contact with the signal generation guide assembly. A first elastic body is disposed below the vertically moving conductive material for providing the vertically moving conductive material with a force to get in contact with the signal generation guide assembly. The first elastic body and the signal generation guide assembly is supported by a base that serves, inter alia, to transfer an electrical signal to a main printed circuit board.

According to another aspect of the present invention, there is provided a mobile communication terminal that comprises a main body, a liquid crystal display (LCD) module coupled to the main body for displaying input data. A recess portion is formed on the top surface of the main body, and a center key is positioned in the recess portion. The center key is arranged to be slidingly movable in an uppermost or lowermost direction or in a radial and circumferential direction from the center of the recess portion. A data input assembly generates an electrical signal upon depressing the center key after movement of the center key for entering desired data into the terminal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Now, a preferred embodiment of the present invention will be described herein below with reference to the accompanying drawings. In the following description, well-known functions or constructions are not described in detail since they would obscure the invention in unnecessary detail.

Figure 1:
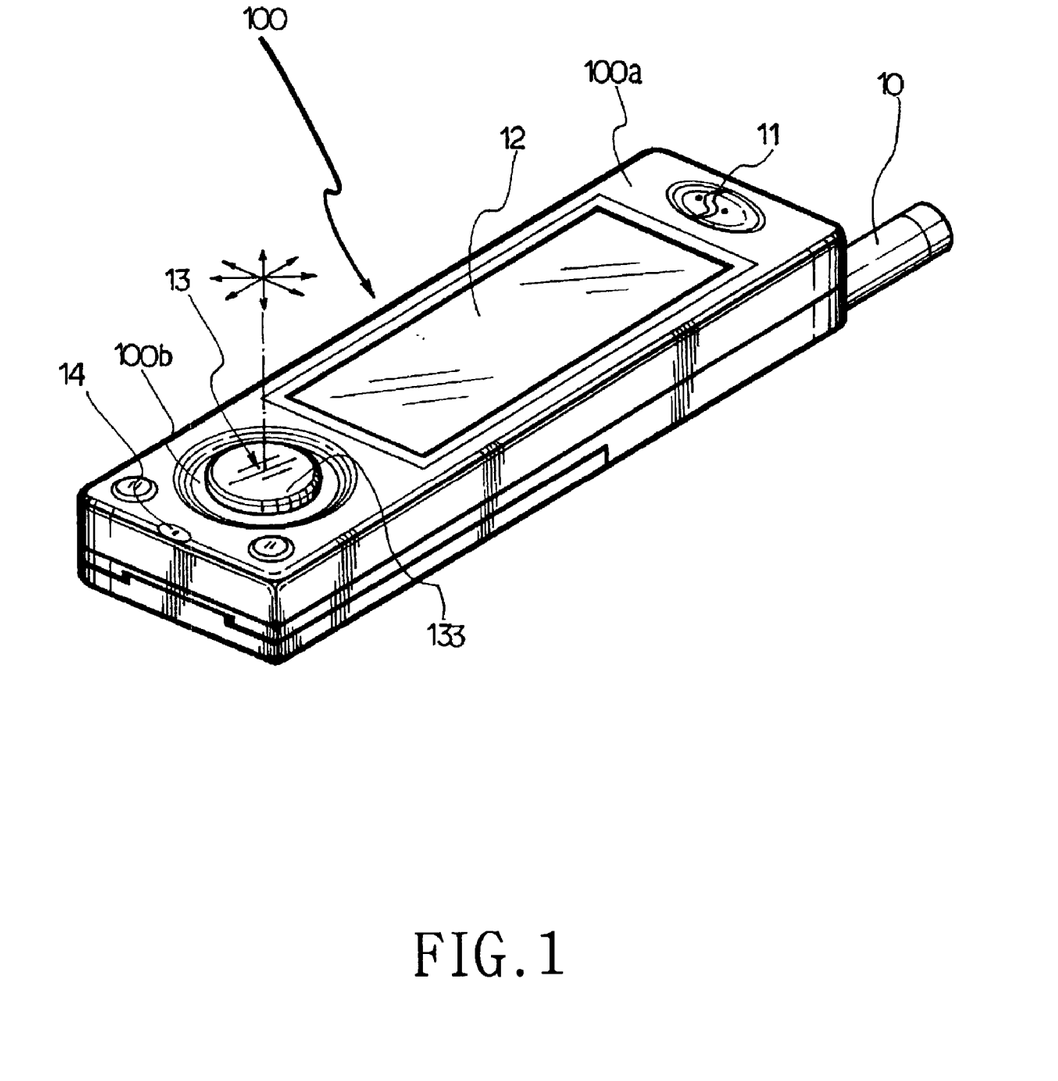
FIG. 1 is a perspective view of a mobile phone utilizing a one-keyed data inputting system according to a preferred embodiment of the present invention.
Figure 2:
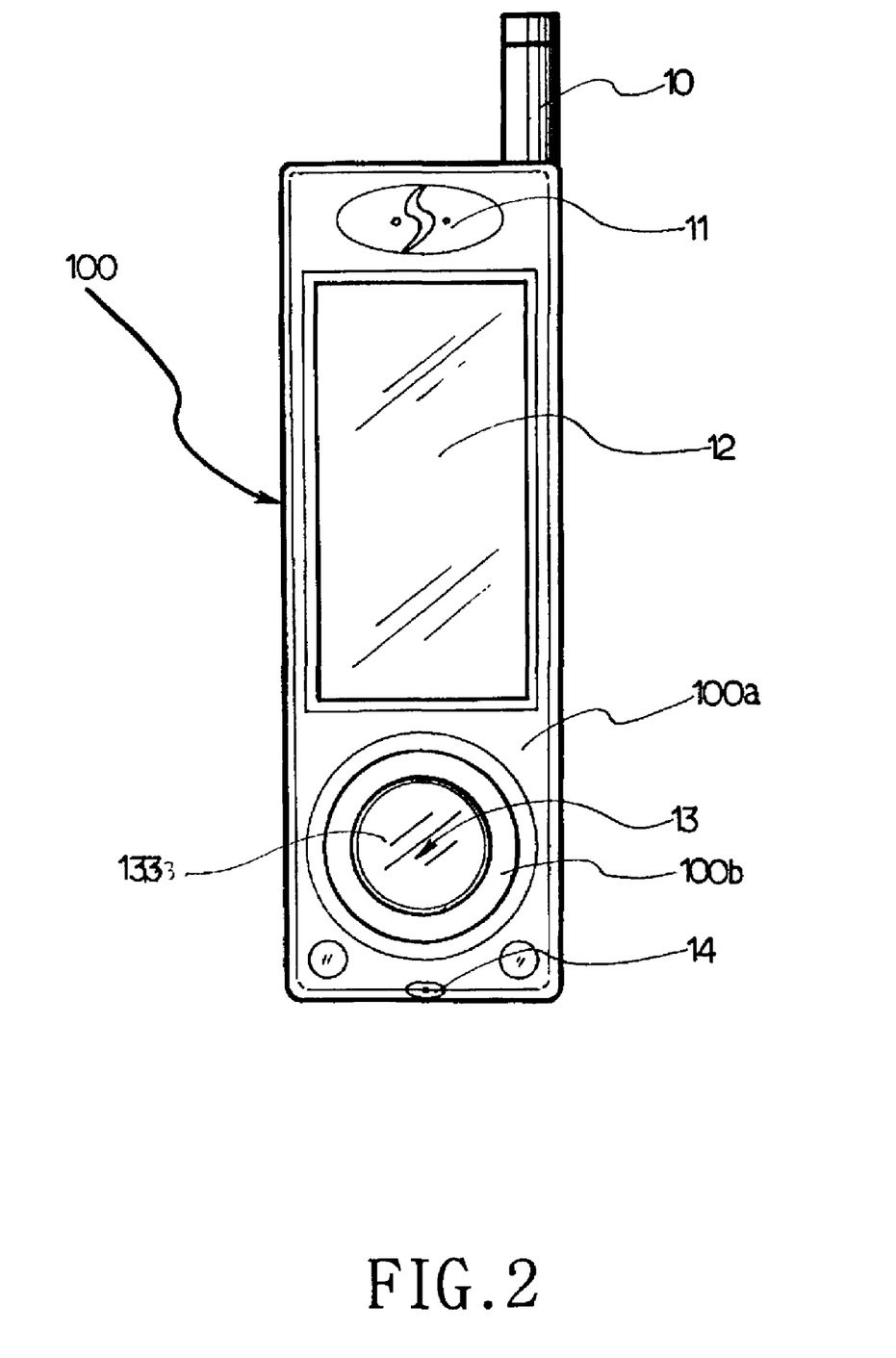
FIG. 2 is a plan view of the mobile phone set forth in FIG. 1.

Referring now to FIG. 1 showing a perspective view of the mobile phone adopting a one-keyed data inputting system according to a preferred embodiment of the present invention, and FIG. 2 showing a plan view of the mobile phone set forth in FIG. 1, the mobile phone or terminal according to the present invention has a main body 100, an antenna 10 extendably attached to the main body, an earpiece 11, a wide LCD module 12, a one-keyed data input device 13, and a microphone 14. The antenna 10 serves to receive and transmit radio wave signals, the earpiece 11 is provided with a speaker (not shown) within it to serve as a hearing part, and the microphone 14 serves as a speaking part in the mobile phone. On the wide LCD module 12 is displayed input data. The one-keyed data input device 13 serves to input desired data by means of pushing, drawing or depressing by the user's fingers with respect to a body of the mobile phone. A center key 133 of the one-keyed data input device 13 is configured to freely move toward directions indicated by arrows as set forth in FIG. 1. Accordingly, the one-keyed data input device 13 according to the present invention carries out the entry of desired data owing to movement of the center key 133 by pushing, drawing or depressing of the user's fingers on it.

User data inputted by means of the one-keyed data input device 13 are to be displayed on the wide LCD module, when the user moves the center key 133 on the one-keyed data input device 13 in the directions indicated by arrows in order to enter any desired data. A recess portion 100b, preferably of a circular shape, is formed on the top of the main body 100a, on which recess portion the center key is slidably moved in the directions of arrows shown in FIG. 1. The recess portion 100b is preferably of a circular shape adapted to receive the center key 133 for providing sliding movement thereon.

Figure 3:
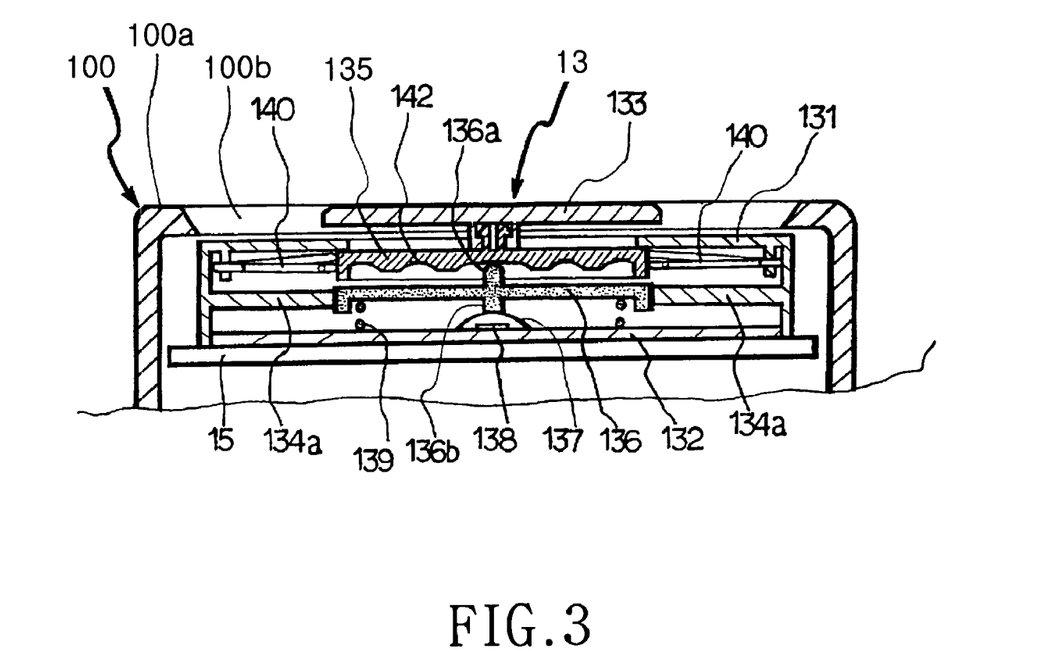
FIG. 3 is a side elevation sectional view of the mobile phone body equipped with the one-keyed data inputting system according to a preferred embodiment of the present invention.
Figure 4:
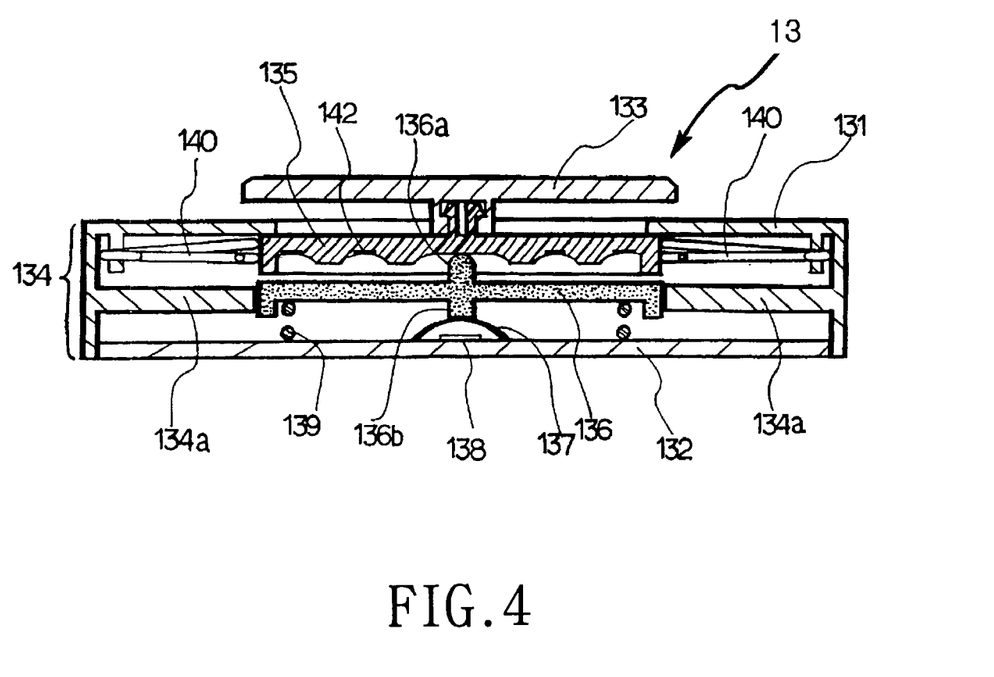
FIG. 4 is a side elevation sectional view representative of construction of the one-keyed data inputting system according to a preferred embodiment of the present invention.

Referring now to FIG. 3 and FIG. 4, more detailed description on the one-keyed data input device according to a preferred embodiment of the present invention is made hereinafter. FIG. 3 shows a side elevation sectional view of the mobile phone body equipped with the one-keyed data input device, and FIG. 4 shows a side elevation sectional view representative of schematic construction of the one-keyed data input device, according to a preferred embodiment of the present invention. The one-keyed data input device 13 is downwardly disposed within the recess portion 100b formed on the top surface of the main body 100, and includes the center key 133 and a data input assembly 134 coupled to the center key. This combination of the center key 133 and the data input assembly 134 is configured in such a manner that the center key is exposed to the outside of the main body 100 and the data input assembly 134 is disposed inside the main body. The assemblage of the one-keyed input device 13 according to the present invention is preferably carried out in such a way that after incorporating the data input assembly 134 into the main body 100, the center key 133 is suitably coupled to the data input assembly in a vertical direction.

The outer framework of the data input assembly 134 includes a casing 131 and a base 132 assembled to the casing 131, wherein the casing 131 functions as a kind of a housing to support and protect the data input assembly, while the base 132 serves to transfer associated electrical signals to a main printed circuit board 15 arranged within the main body 100 and to support the casing 131 from the bottom of it. The base 132 preferably includes the printed circuit board 15 in the inside of it.

The data input assembly 134 includes a guide 135 for signal generation, being incorporated into the center key 133, which guide is configured to move along with the direction of movement of the center key 133, and includes a conductive material 136 for transferring to the base 132 an electrical signal induced owing to the movement of the guide 135. The data input assembly 134 further includes a first elastic body 139 for subjecting the conductive material 136 to an elastic force towards a direction away from the base 132, that is to say, a direction in closer contact with the guide 135 for signal transfer, and a second elastic body 137 disposed in between the base 132 and the conductive material 136. Additionally, the guide 135 for signal generation of the data input assembly 134 is further provided with a third elastic body 140, so that it always takes a restoring force back to its original (center) position. Further, the conductive material 136 is supported to move in the vertical direction by way of a guide 134a horizontally extending in the inner wall of the casing 131.

The conductive material 136, in one aspect, includes a first protrusion 136a tightly and upwardly contacting the guide 135 for signal generation, and a second protrusion 136b extending toward the second elastic body 137. A step end portion of the first protrusion 136a is preferably configured in hemispheric form for a sliding movement against the guide 135, and the second protrusion 136b serves to press down the second elastic body 137 upon depression of the center key 133. Describing in further detail, the first elastic body 139 may be formed of a compressed coil spring and the second elastic body 137 may be configured in a metal dome. Further, a contact 138 is disposed in between the metal dome 137 and the base 132 for transferring the electrical signal generated from the guide 135 to the base 132 via the conductive material in case the metal dome has been depressed.

Figure 5:
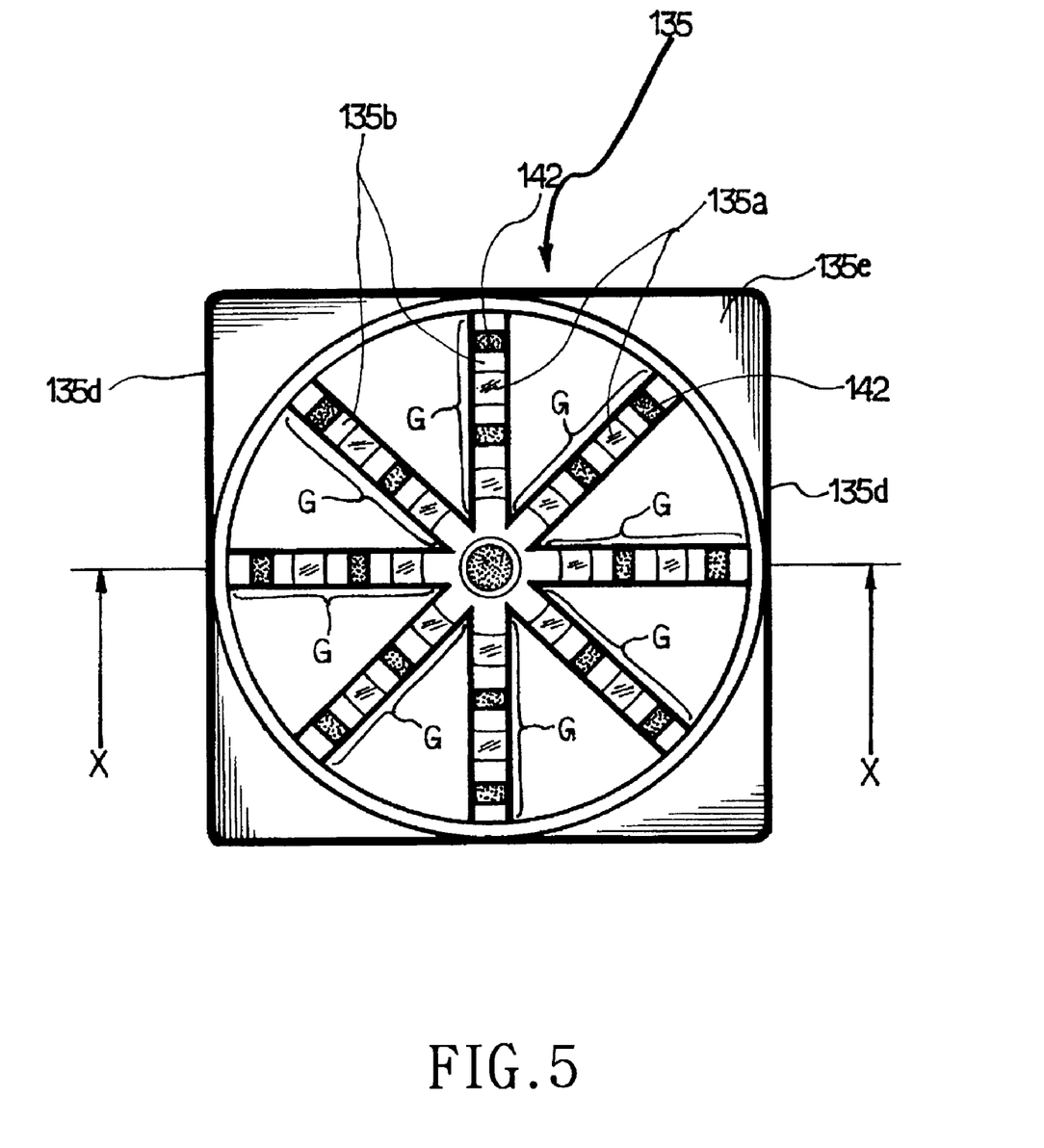
FIG. 5 is a bottom view of a signal generating guide assembly according to a preferred embodiment of the present invention.
Figure 6:
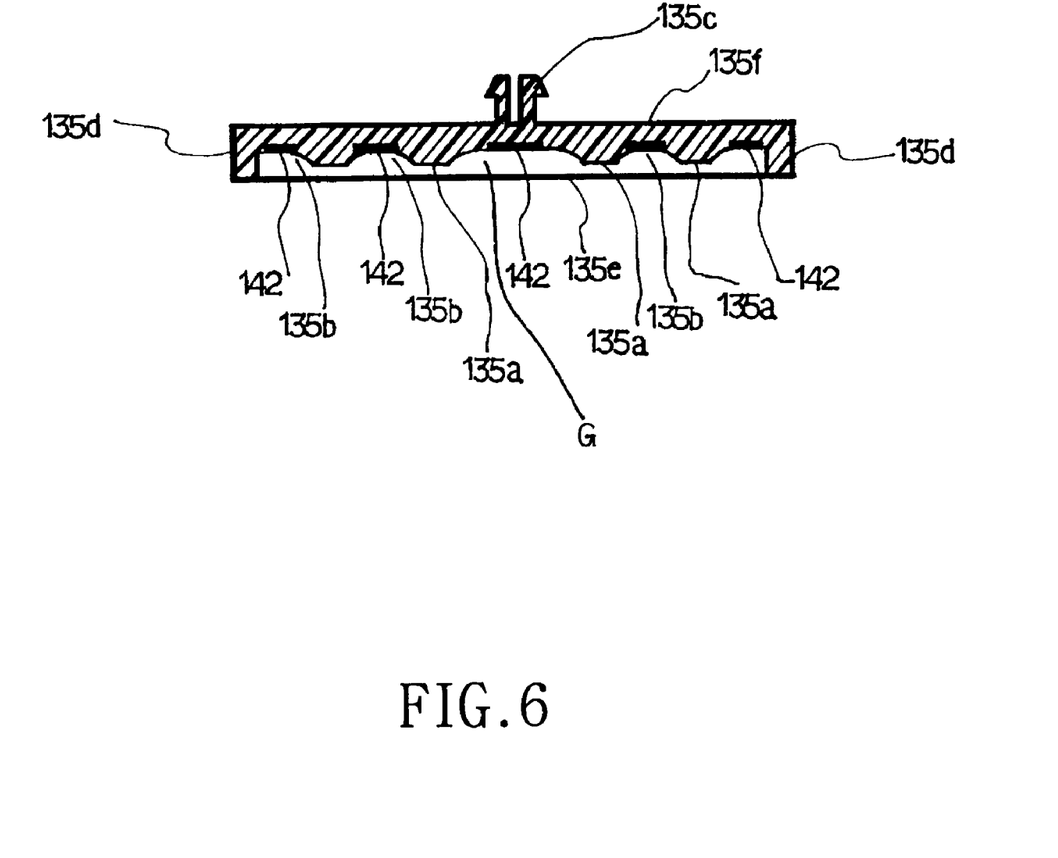
FIG. 6 is a sectional view of a portion of signal generating guide assembly indicated by a line X—X of FIG. 5.

Referring now to FIG. 5 and FIG. 6, the construction of the guide 135 for signal generation according to a preferred embodiment of the present invention will be described in further detail, wherein FIG. 5 is a bottom view of the guide 135 and FIG. 6 is a sectional view of the guide 135 indicated by a line X—X of FIG. 5. The guide 135 for signal generation includes an upper surface section 135f and a lower surface section 135e, in which the upper surface section 135f has a locking element 135c extending upwardly of it and the lower surface section 135e is provided with a guide element G extending radially with respect to its center. This guide element G is defined by a partially recessed portion formed with a predetermined width on the lower surface section 135e, and is of a wavelike form having a protrusion part 135a and a recessed part 135b alternately. Further, the guide element G is configured in such a way that it is provided with a plurality of, for example, eight, guide arms each extending outwardly from the center toward eight radial directions as illustrated in FIG. 5. Accordingly, the guide element G is allowed to perform sliding movement tightly with respect to the conductive material 136 shown in FIG. 4 along the aligned direction of the guide G. There are shown in FIGS. 5 and 6, by way of example, only two protrusion parts 135a arranged on one guide arm and two recessed parts 135b arranged between these two protrusion parts, apart from another recessed part formed in the center. However, it should be appreciated that more than two protrusion parts 135a and two recessed parts 135b may be provided on the respective guide arm.

The recessed part 135b is provided with a signal generation section 142 respectively, which serves to generate an electrical signal upon contacting a first protrusion 136a of the guide for signal generation. Hence, when the first protrusion 136a is allowed to contact the signal generation section 142 and the center key 133 has been depressed, the generated signal is transferred to the contact 138 and the base 132 through the conductive material 136. However, a separate sensor for signal detection may be used for the signal generation section 142 and the signal generation section may be constructed as a terminal for detection of signal. In one aspect, different signals may be generated for different key positions.

Figure 7:
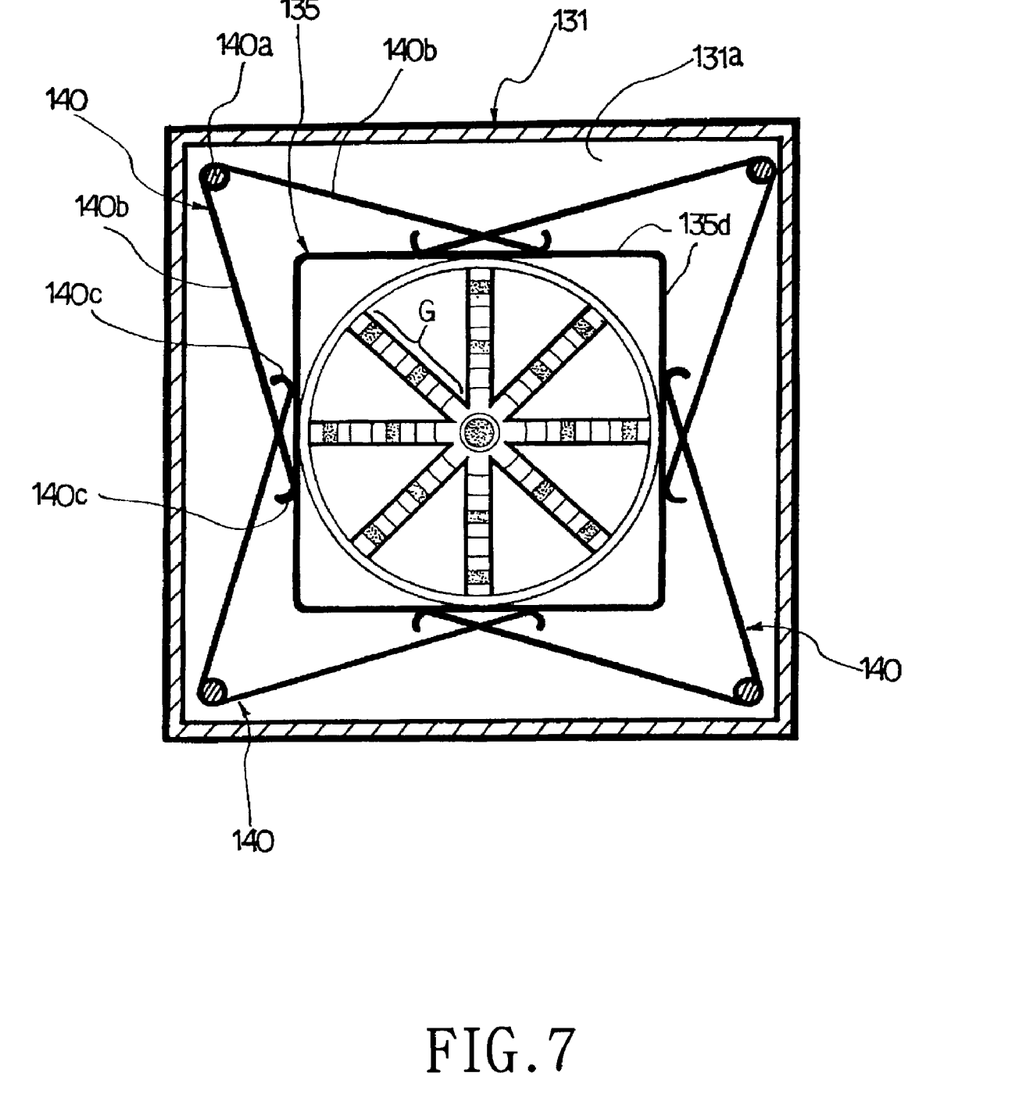
FIG. 7 is a schematic view showing the equipment with a torsion spring used to restore the signal generating guide assembly according to a preferred embodiment of the present invention.

Referring then to FIG. 7, a description is made for construction and operation of the third elastic body 140 in conjunction with a torsion spring used to restore the signal generating guide assembly according to a preferred embodiment of the present invention. As seen in the FIG. 7, the guide 135 for signal generation according to the present invention is provided with the guide element G to guide the center key in the eight radial directions (each direction being centrifugally arranged at intervals of 45 degrees from each other) and is also provided with the signal generation section 142, for example, a terminal for detection of signals each being operatively coupled to the recessed part in order to generate an electrical signal according to movement of the center key. The guide 135 for signal generation is supported by four third elastic bodies 140 and applied by an elastic force restoring to the center of the guide. The four third elastic bodies 140 are arranged in such a way that a fixed end 140a is fixed to a protrusion disposed in the corner of a ceiling 131a of the casing and its free end 140b extends toward a sidewall 135a of the guide 135. Thus, these four elastic bodies 140 are arranged symmetrically with respect to the signal generation guide 135, so that the fixed ends 140a of the torsion spring are positioned in the diagonal direction of the guide 135 and its step ends 140c of the torsion spring are respectively arranged in the uppermost and lowermost edges and the leftmost and rightmost edges of the guide 135.

The elastic bodies 140 may include one or more torsion springs having a fixed end 140a and two free ends 140b each extending at a predetermined angle from the fixed end and retaining a force to get closer to each other. Each torsion spring 140 operates in such a way that one free end of the both free ends 140b makes a sliding movement in contact with the sidewall 135d of the signal generation guide 135 and the other free end 140b makes a sliding movement in contact with other adjacent sidewall 135d of the signal generation guide 135. Here, it should be noted that such a sliding movement is effected according to the movement of the signal generation guide 135. Since the signal generation guide 135 is configured to provide a tension retained in itself with contacting the two overlapping free ends 140b of the torsion spring, it will be always subject to working of a centripetal force so far as any external force is not applied intentionally. Preferably, the step end 140c of the torsion spring is formed in curvature so as to allow more smooth sliding movement along with movement of the guide 135, in which the curved portions of the step ends 140c of the torsion spring are formed in such a way that they face the opposite direction from each other. This curvature structure of the step end 140c of torsion spring allows more smooth sliding movement with the sidewall 135d.

Figure 8:
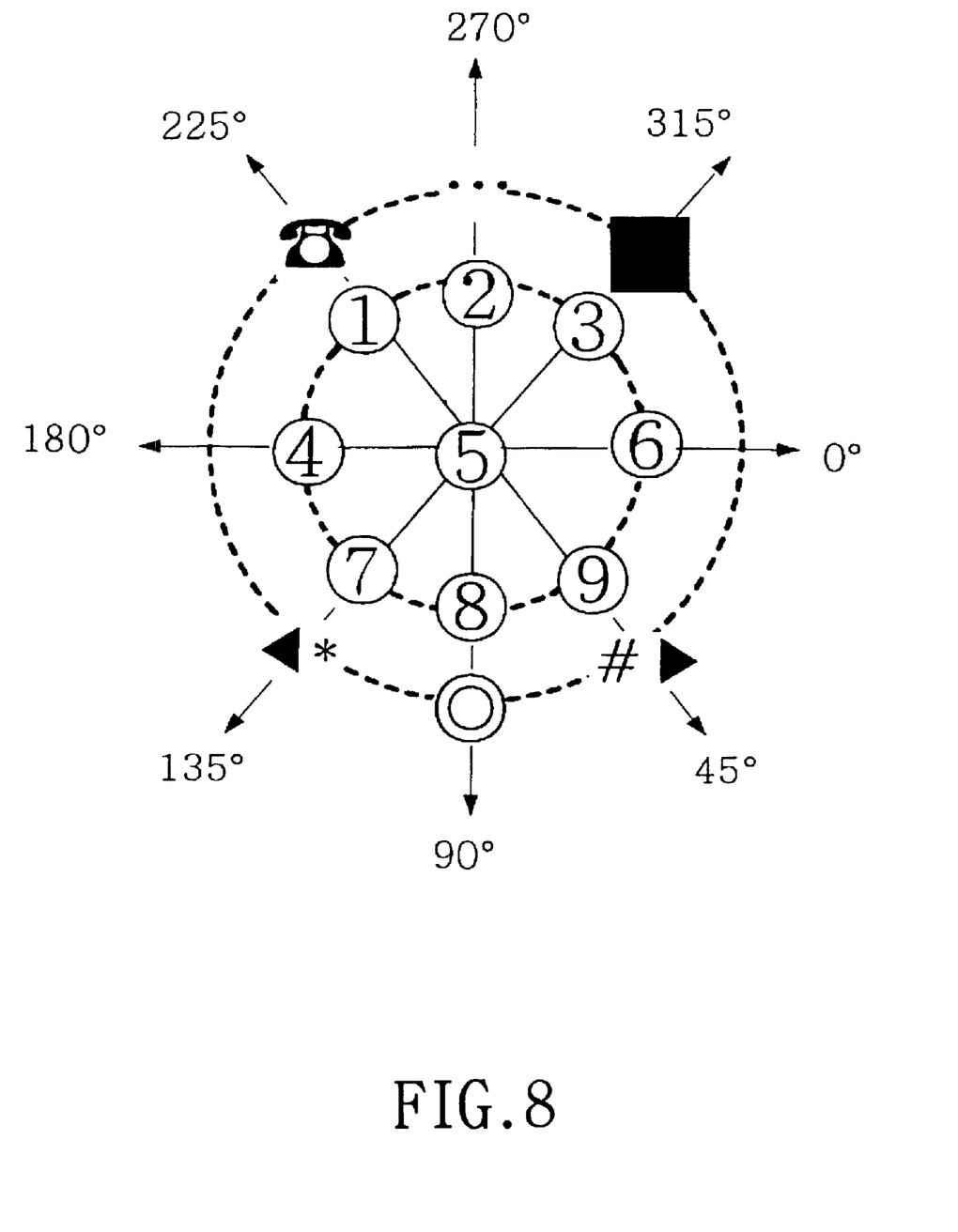
FIG. 8 is a schematic diagram for illustrating various data displayed upon depression of keys subsequently to movement of a center key according to a preferred embodiment of the present invention, representing a numeral or symbol marked above the center key.

FIG. 8 shows a schematic diagram for illustrating various data inputted upon selection of keys in association with movement of the center key according to a preferred embodiment of the present invention, representing a numeral or symbol marked above the center key. As shown in the drawings, assuming that a user intends to enter, for instance, a number "9498" into his mobile phone, he moves the center key to 45° direction utilizing his own fingers and presses down the key. Upon releasing of this pressing down action, the center key comes back to the center position. Subsequently, the center key is once again moved to 180° direction utilizing his fingers, pressed down on it and then released of any force applied by fingers, so as to have it come back to the center position. Then, the center key is again moved to 45° direction, pressed down on it and then released of any force applied by fingers. Finally, the center key is once again moved to 90° direction, pressed down on it and then released of any force applied by fingers. These sequential key manipulating actions with the center key is served to enter the aforementioned data "9498" into his mobile phone. An input operation of any desired data is effected by movement of a center key to any desired position and pressing down on it.

Figure 9:
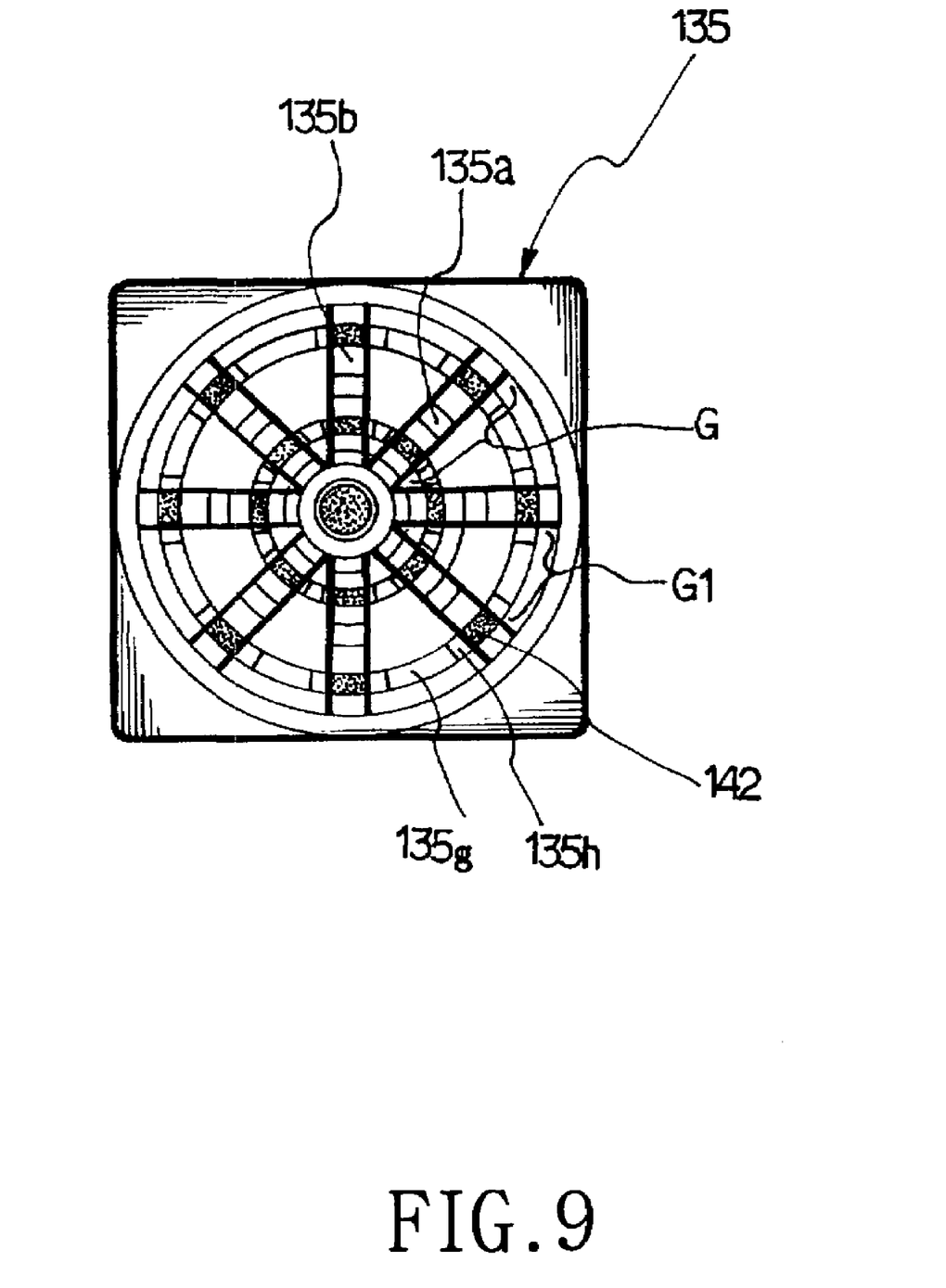
FIG. 9 is a bottom view of a signal generating guide assembly according to another preferred embodiment of the present invention.

FIG. 9 shows a bottom view of the signal generation guide assembly for a one-keyed data input device according to another preferred embodiment of the present invention, wherein additional guide elements are further provided in the circumferential direction to direct the movement of the center key. Thus, additional guide element G1 extending in the circumferential direction of the signal generation guide 135, as well as the aforementioned guide elements G extending toward the radial direction from the center, allows the user to perform any desired data input operation with more simple and convenient manipulation of fingers. According to the present invention, more than two additional circumferential guide elements G1 may be arranged in the signal generation guide assembly, in particular, in such a way of connecting the signal generation parts 142 in the circumferential direction with each other. The additional circumferential guide elements G1 includes at least one protrusion part 135g and at least one recessed part 135h formed in between the protrusion parts, and the recessed part 135h may be further provided with a signal generating part, preferably, a terminal 142 for signal detection.

Now, a description will be made in regard to the input operation of the numeric data "9498" utilizing the signal generation guide assembly set forth in FIG. 9. Assuming that a user intends to enter, for instance, a number "9498" into his mobile phone, he moves the center key to 45° direction using his fingers and presses down the center key. Upon releasing of such pressing action, the center key returns to its center position. Subsequently, the center key is once again moved to 180° direction using his fingers, pressed down on it and then released of any force applied by fingers, so as to have it come back to the center position. Then, the center key restored to the center is once again moved to 45° direction, pressed down on it and then finally moved to a next position indicated by the number "8" (see FIG. 8) along the circumferential guide. Then, pressing down again on this center key completes the data input operation of desired data. These sequential key manipulating actions with the center key is served to enter the aforementioned data "9498" into his mobile phone according to another preferred embodiment of the present invention.

Summarizing the above operation, after firstly moving the center key to a desired position, the key is pressed down to cause the desired key data to be inputted into the mobile phone. Upon inputting the desired data, the movement of the center key to the desired position is preferably carried out using the shortest path from the center key. As a result, the one-keyed data input device according to the present invention makes it possible with more ease and convenience to achieve the input operation of any desired data using one finger, and to accommodate a wider LCD module for displaying the input data thereon. Additionally, more flexibility can be effected in the course of design of a main body in the mobile phone.

In the meantime, the one-keyed data input device according to the present invention may be similarly applied to any type of mobile phones that require more reduction in size, in particular, of the main body. Further, the one-keyed data input device according to the present invention may be constructed as a separate assembly or apparatus being capable of attachment to the main body as necessity arises or a portable type of data input device with appropriate modifications effected. Furthermore, the one-keyed data input device according to the present invention may be constructed with a detachable type or a remote controlled type.

As apparent from the foregoing description, the present invention makes it possible to achieve data input operation of any desired data utilizing one center key. As a result, it is possible to minimize a keypad area occupied by various keys in a main body of a mobile phone. In particular, the present invention allows a larger LCD module to be installed onto the main body with a wider display area, resulting in more flexibility and usefulness for mobile phones, and especially for those that are Internet-enabled. Moreover, a user may carry out data input operation of any desired data using his one finger, which provides the user with convenience during use of it.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A one-keyed data input device for a mobile communication terminal, comprising:
   a recess portion formed on a top surface of a main body of a terminal;
   a center key positioned in the recess portion, said center key being arranged to be movable in an uppermost or lowermost direction or in a leftmost or rightmost direction from the center of the recess portion and movable in a radial direction from the center; and
   a data input assembly having a signal generation guide assembly for generating, after moving the signal generation guide assembly to a desired location and depressing the the center key, an electrical signal for selected data, said signal generation guide assembly being moveable together with the center key coupled thereto, a vertically moving conductive material disposed below and in contact with the signal generation guide assembly, a first elastic guide body disposed below the vertically moving conductive material for providing the vertically moving conductive material with a force to make contact with the signal generation guide assembly, a base supporting the first elastic body and the signal generation guide assembly, the base for transferring an electrical signal to a main printed circuit board,
   wherein the electrical signal inputs different data depending upon the desired location of the center key.

2. The one-keyed data input device according to claim 1, wherein the signal generation guide assembly further comprises a plurality of guides for guiding the direction of movement of the center key.

3. The one-keyed data input device according to claim 2, wherein at least one of said plurality of guides are arranged to respectively extend in at least one radial direction from the center of the signal generation guide assembly.

4. The one-keyed data input device according to claim 2, wherein at least one of said plurality of guides are arranged to extend in a circumferential direction from the center of the signal generation guide assembly.

5. The one-keyed data input device according to claim 2, wherein at least two of said plurality of guides are arranged to extend in at least one radial and circumferential directions respectively from the center of the signal generation guide assembly, and the radial extending guide and the circumferential extending guide are connected to each other.

6. The one-keyed data input device according to claim 2, wherein said plurality of guides each have a wavelike cross-section.

7. The one-keyed data input device according to claim 2, wherein said plurality of guides each have at least one protrusion part and at least one recessed part arranged adjacent to the at least one protrusion part.

8. The one-keyed data input device according to claim 7, wherein said recessed part further comprises a signal generation part, and the signal generation part is positioned in the bottom area of the recessed part so as to produce an electrical signal when in contact with the vertically moving conductive material.

9. The one-keyed data input device according to claim 1, further comprising a second elastic body arranged between said vertically moving conductive material and said base.

10. The one-keyed data input device according to claim 9, wherein said second elastic body is constructed of a metal dome.

11. The one-keyed data input device according to claim 2, further comprising a third elastic body arranged to support the plurality of guides in the side direction for providing a restoration force coming back to its original position.

12. The one-keyed data input device according to claim 11, wherein a plurality of the third elastic bodies are provided, with each third elastic body comprising a fixed end arranged in a respective corner of the data input assembly and two free ends each extending from the fixed end at a predetermined angle, said free ends having a tension urging the free ends closer to each other and for making contact with a sidewall of the signal generation guide assembly.

13. The one-keyed data input device according to claim 11, wherein more than two third elastic bodies are arranged in symmetry.

14. The one-keyed data input device according to claim 12, wherein said two free ends each have a curvature formed in a direction of its distal end from each other.

15. The one-keyed data input device according to claim 12, wherein said third elastic body is configured in such a way that a fixed end is positioned in a diagonal direction with respect to the signal generation guide assembly and the free ends are respectively positioned on a first side and an adjacent side of the signal generation guide assembly.

* * * * *